United States Patent [19]

Kost et al.

[11] Patent Number: 4,862,368
[45] Date of Patent: Aug. 29, 1989

[54] METHOD FOR ADJUSTING OPTIMAL WHEEL SLIP

[75] Inventors: Friedrich Kost, Stuttgart; Anton Van Zanten, Ditzingen; Gerhard Heess, Tamm; Gerhard Kreisselmeier, Ahnatal, all of Fed. Rep. of Germany

[73] Assignee: Robert Bosch GmbH, Stuttgart, Fed. Rep. of Germany

[21] Appl. No.: 24,101

[22] PCT Filed: Jun. 4, 1986

[86] PCT No.: PCT/EP86/00334

§ 371 Date: Feb. 4, 1987

§ 102(e) Date: Feb. 4, 1987

[87] PCT Pub. No.: WO86/07321

PCT Pub. Date: Dec. 18, 1986

[30] Foreign Application Priority Data

Jun. 4, 1985 [DE] Fed. Rep. of Germany ....... 3519888

[51] Int. Cl.$^4$ ................................................ B60T 8/32
[52] U.S. Cl. ............................ 364/426.02; 364/426.01; 303/100; 303/109
[58] Field of Search ............... 364/426, 426.01, 426.02, 364/426.03; 361/238; 180/197; 303/100, 104, 106, 109, 95

[56] References Cited

U.S. PATENT DOCUMENTS

| | | | |
|---|---|---|---|
| 3,131,975 | 5/1964 | Smith et al. | 303/104 |
| 3,614,172 | 10/1971 | Riordan | 303/109 |
| 3,967,862 | 7/1976 | Hunter et al. | 180/197 |
| 4,679,866 | 7/1987 | van Zanten et al. | 303/104 |
| 4,693,522 | 9/1987 | Wupper et al. | 303/108 X |
| 4,715,662 | 12/1987 | van Zanten et al. | 364/426 X |

FOREIGN PATENT DOCUMENTS

| | | |
|---|---|---|
| 2204092 | 8/1972 | Fed. Rep. of Germany . |
| 2530609 | 1/1977 | Fed. Rep. of Germany . |
| 3009519 | 9/1980 | Fed. Rep. of Germany . |
| 1407168 | 6/1965 | France . |
| 1018548 | 1/1966 | United Kingdom . |

Primary Examiner—Eugene R. LaRoche
Assistant Examiner—Seung Ham
Attorney, Agent, or Firm—Edwin E. Greigg

[57] ABSTRACT

The goal of this concept is to adjust a wheel slip value, during a controlled braking of a vehicle wheel, at which, on the one hand, the coefficient of adhesion $\mu$ in the longitudinal direction is near the maximum attainable value, and on the other hand, an adequate coefficient of adhesion is available in the transverse direction. This slip value is below the value at which the coefficient of adhesion in the longitudinal direction is at a maximum. While at the maximum coefficient of adhesion in the longitudinal direction the wheel slip curve $\mu(\lambda)$ has a slope of zero, $\mu(\lambda)$ assumes positive slopes at the slip value to be adjusted. In addition to the advantage of greater cornering forces, the concept presented offers the opportunity of purposefully limiting the yawning moments engaging the vehicle during controlled braking and thereby improving control of the vehicle.

23 Claims, 6 Drawing Sheets

METHOD FOR ADJUSTING OPTIMAL WHEEL SLIP

The invention relates to a method for adjusting a vehicle wheel slip which is optimized in terms of the coefficient of adhesion in the longitudinal and transverse directions, hereinafter.

Methods for regulating wheel slip are known and are used for anti-skid or anti-lock control (see German Patent 30 09519, for example). In these known methods, a fixed maximum wheel slip ($V_F$-$V_R$/$V_F$), of 15%, for instance, is specified, where $V_R$=wheel speed and $V_F$ is the vehicle speed, and the brake pressure is regulated such that the slip is below this threshold.

It is an object of the present invention, during a regulated braking of a vehicle wheel, to set a wheel slip value at which on the one hand the coefficient of adhesion $\mu$ in the longitudinal direction is near the maximum attainable value, and on the other hand an adequate coefficient of adhesion is available in the transverse direction. The slip value required for this is below the value at which the coefficient of adhesion in the longitudinal direction is at a maximum.

This object is attained by means of the novel characteristics recited herein.

While the wheel slip curve $\mu(\lambda)$ has a zero slope at the maximum coefficient of adhesion in the longitudinal direction, $\mu(\lambda)$ assumes positive slopes at the slip value that is to be set. This is shown in FIG. 1. Besides the advantage of higher cornering forces, the teaching according to the invention makes a purposeful limitation of the yawing moments engaging the vehicle during regulated braking possible, thus improving control of the vehicle.

As a function of the specified set-point values, the control concept thus automatically finds a compromise between the maximum possible braking force and high cornering force on the part of the wheel. In contrast to existing control concepts, overly high wheel slip ranges with lower cornering force can be avoided. This property continues to exist even with quite various frictional ratios between the tires and the road.

The specified positive slope value can be specified as a fixed value (e.g., 3-5), but it can also be varied in accordance with instantaneous conditions, for example making it dependent on the steering angle and even making it assume a value of 0 when driving straight ahead, that is, when no coefficient of adhesion in the transverse direction is needed. The slope value can also be made dependent on other parameters, such as on the yawing acceleration of the vehicle.

The slip regulator to which the difference between the detected slip value and a comparison value is supplied may be embodied as a P (proportional) regulator, preferably receiving an I (integral) and/or D differential component as well. From the control variable ascertained by means of this regulator, the appropriate trigger signals are formed depending on the embodiment of the brake pressure control device (for example, a 3/3-way magnetic value). If the brake pressure specified by the driver and the prevailing brake pressure are measured, then the period of time for which the brake pressure control unit must be triggered into one or the other direction (pressure buildup or pressure reduction) can be calculated. However, operation without these measured pressure values is also possible.

It is also possible to specify pulse trains of a given frequency, and to vary the width of the pulses.

In the superimposed cascade control circuit, an estimated variable (identification) for $d\mu/d\lambda$ must be obtained, which is then compared with the fixed value or a variable slope value for $$\left.\frac{d\mu}{d\lambda}\right|_{Soll}.$$

In the controller of the superimposed circuit, either a comparison slip value $\lambda^*_{ref}$ is formed, by means of the differential value, and the slip value $\lambda_{ref}$ dected in the usual manner is compared with the comparison slip value, the difference being processed in the underlying circuit, or the reference speed obtained in the usual manner, which of course represents only an approximation of the actual vehicle speed, is varied by means of the regulation process of the superimposed circuit, and the pseudo-reference speed, thus varied, is incorporated into the process of forming the slip. The slip obtained in this way is then compared with a fixed slip value, and the difference obtained is utilized for varying the brake pressure.

Exemplary embodiments of the invention will be explained in further detail, referring to the drawing.

Shown are:

Figure 3:
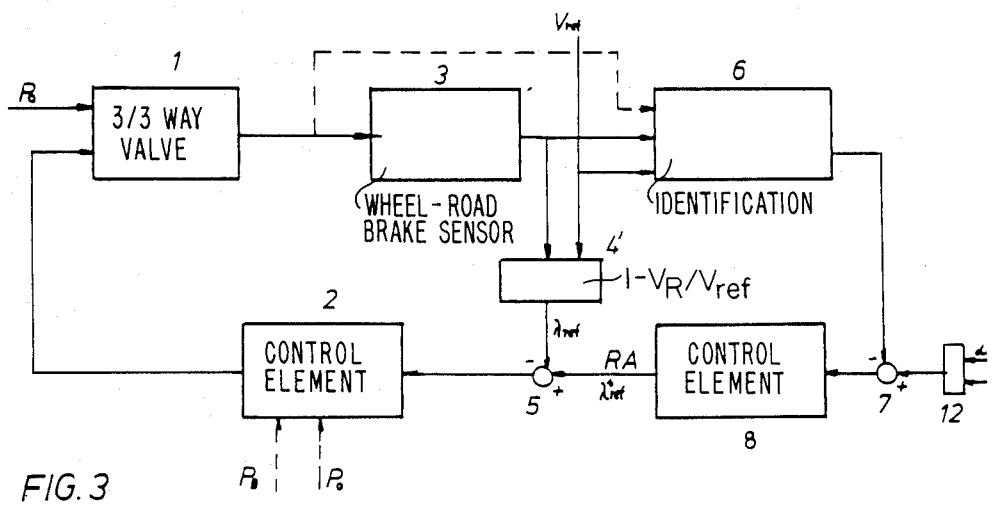
Figure 4:
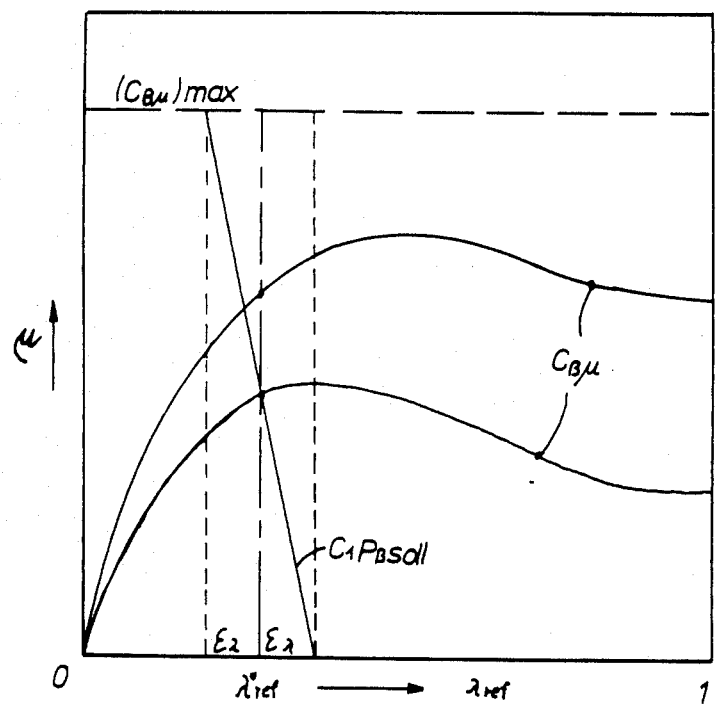
Figure 5:
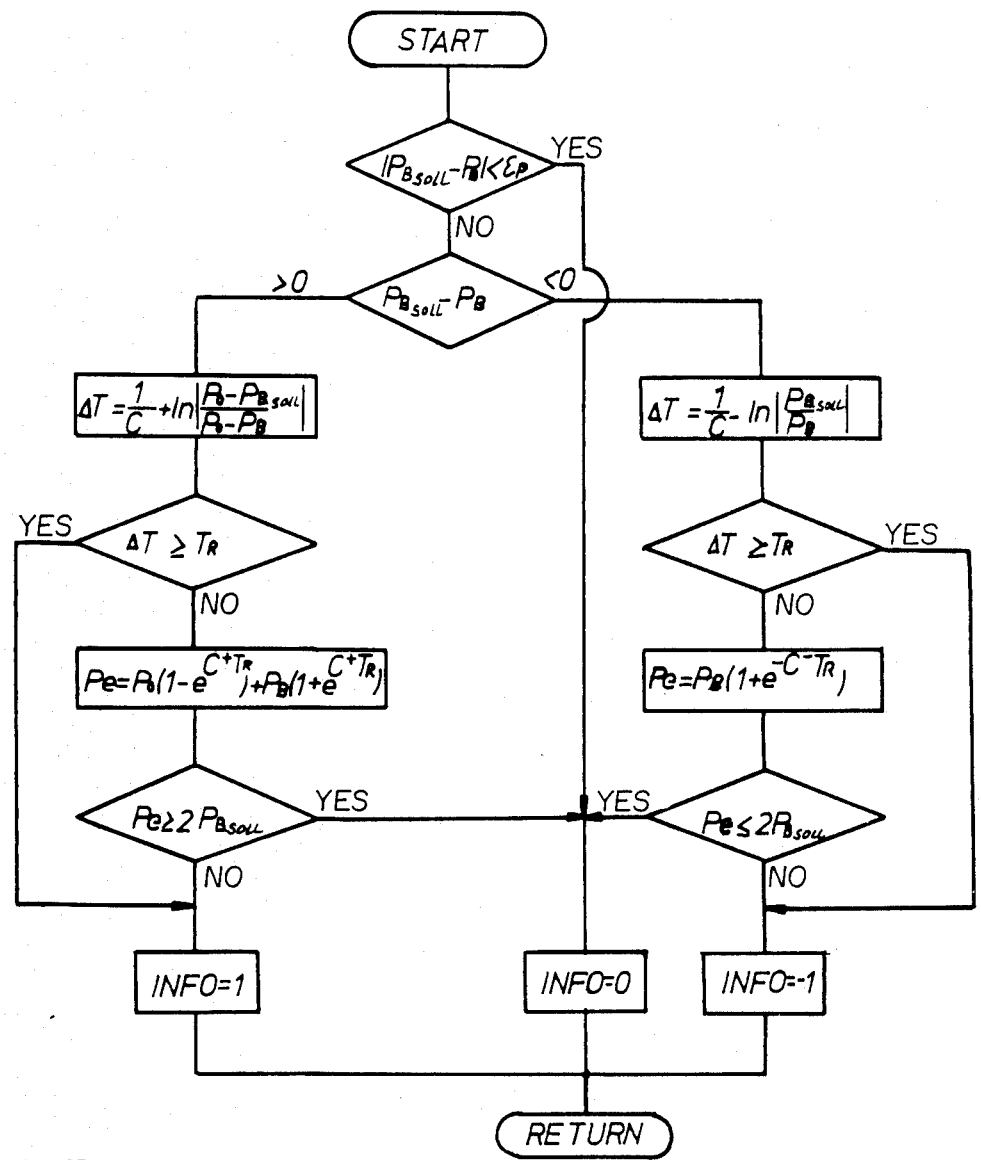
Figure 6:
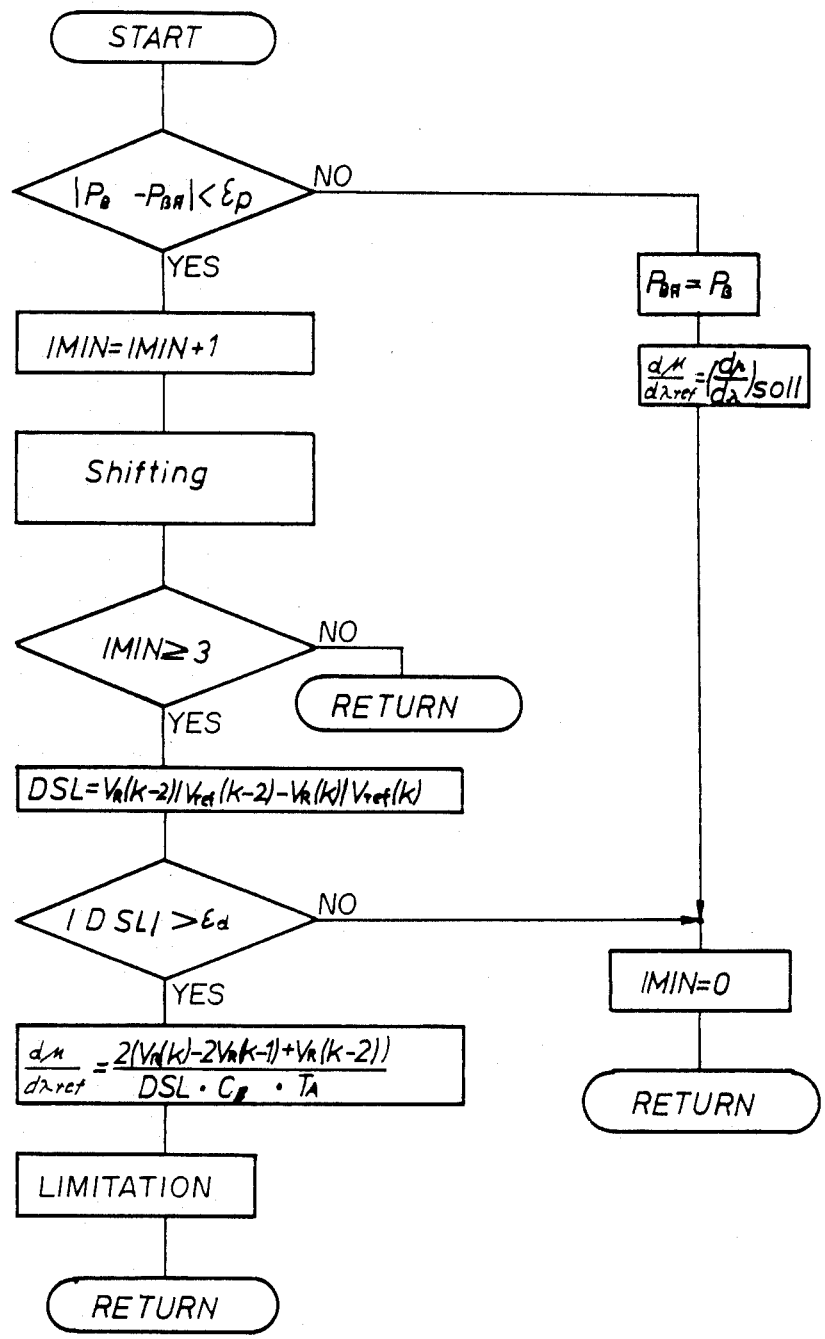
Figure 7:
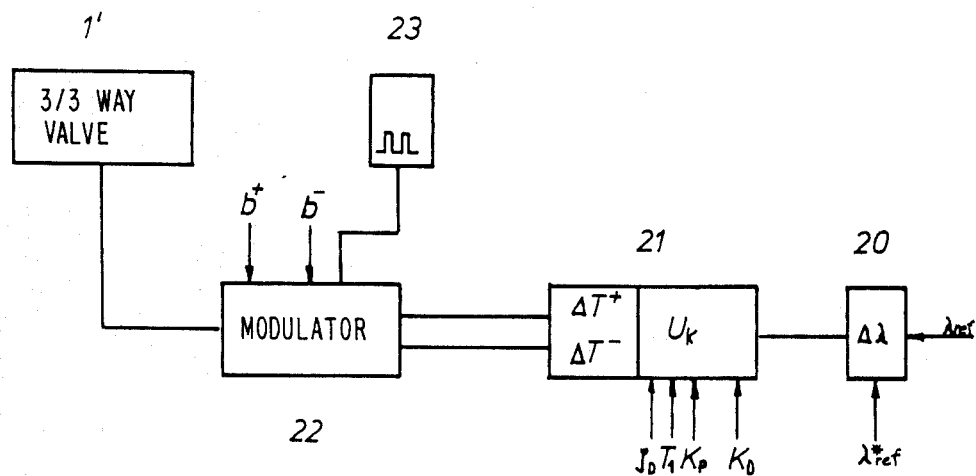
Figure 8:
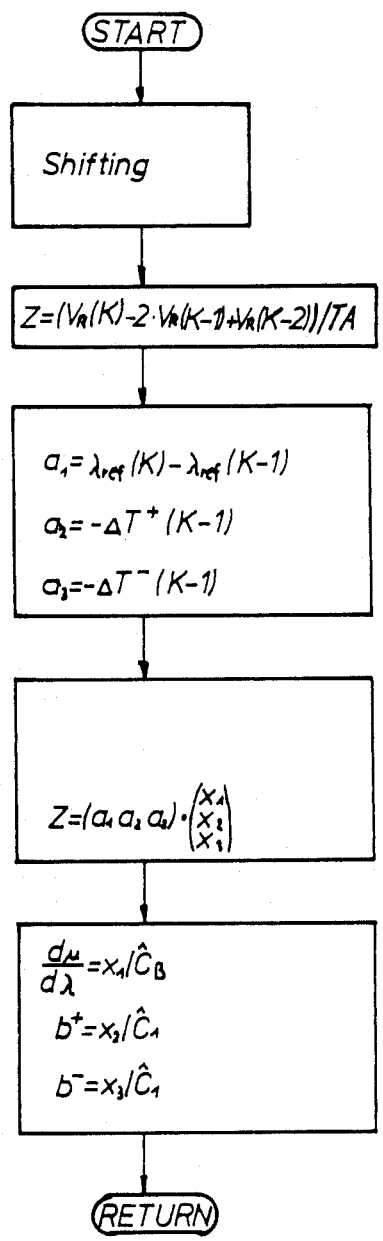
Figure 9:
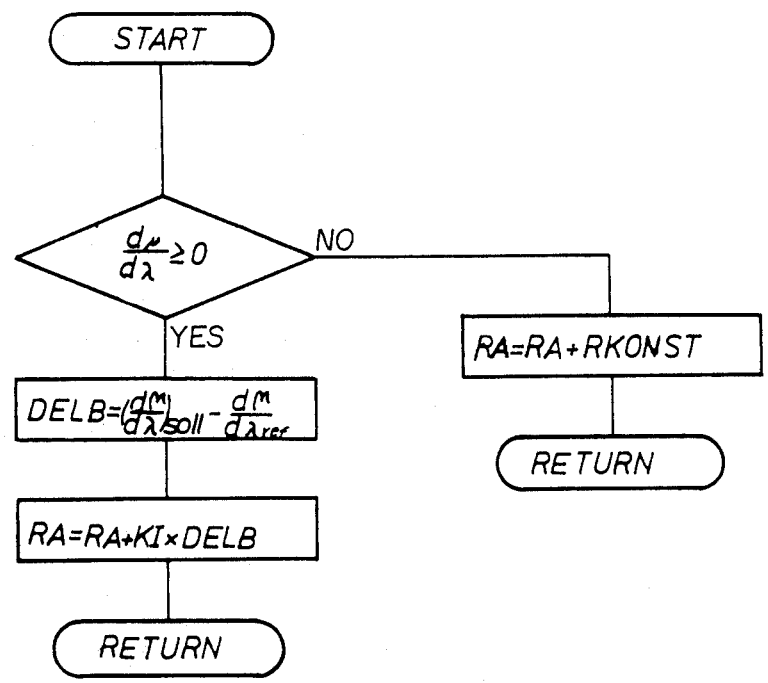

FIG. 3 illstrates another block circuit diagram of a cascade control circuit having a superimposed circuit and an underlying circuit;

FIG. 4 illustrates a diagram showing how the expression for the set-point brake pressure is obtained;

FIG. 5 illustrates a flow chart for ascertaining the trigger signals for the pressure control device;

FIG. 6 illustrates a flow chart for identification of the particular slope value $d\mu/d\lambda_{ref}$ present;

FIG. 7 illustrates a block circuit diagram of a portion of a cascade control circuit in another embodiment;

FIG. 8 illustrates a flow chart for identification of the variables a, b+ and b− that are to be estimated for this purpose; and FIG. 9 illustrates flow chart relating to how the controller signal is obtained in the superimposed control circuit.

Figure 1:
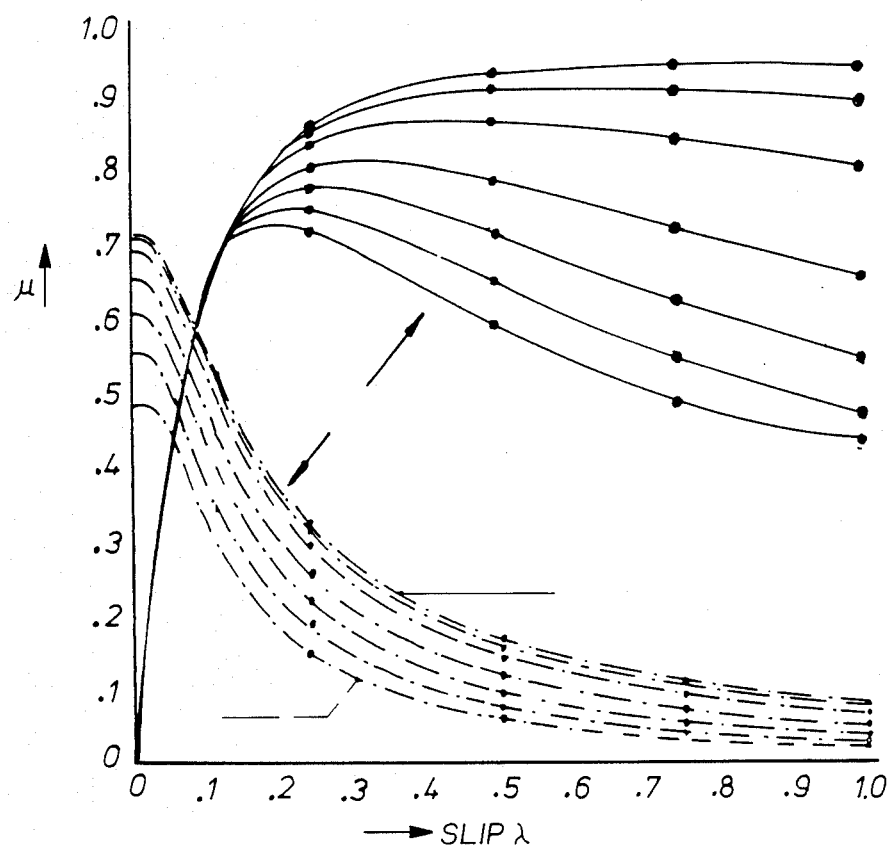
FIG. 1 illustrates two families of curves, showing the course of the coefficient of friction $\mu$ in the longitudinal and transverse directions, with the speed as a parameter.
Figure 2:
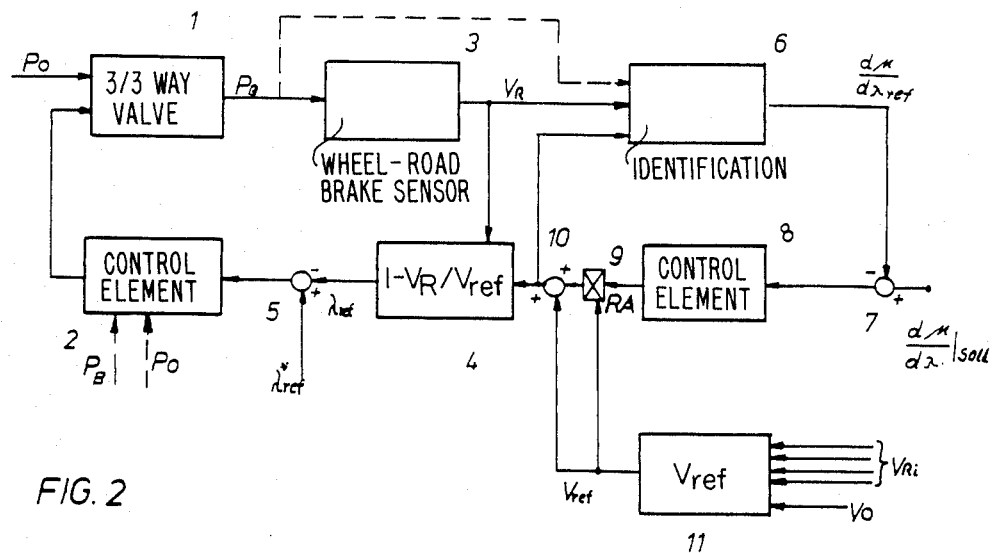
FIG. 2 illustrates a block circuit diagram of a cascade control circuit having a superimposed circuit and an underlying circuit.

In FIG. 2, the underlying control circuit comprises a final control element 1, such as a 3/3-way magnetic valve, which is supplied with the brake pressure $P_o$ produced by the driver and with trigger signals of a control element 2; a block 3 representing the controlled system, wheel-road-brake-sensor, to which the the brake pressure $P_B$ downstream of the 3/3 way valve is supplied and which emits a signal corresponding to the wheel speed $V_R$; an element 4 forming the brake slip $\lambda_{ref}=1-V_R/V_{ref}$, and to which signals corresponding to $V_R$ and $V_{ref}$ are supplied; an addition element 5 forms a difference signal between a fixed specified slip value $\lambda_{ref}^*$ and the detected slip value $\lambda_{ref}$ which signal is directed to and the control element 2, to which the pressure values $P_o$ and $P_B$ may also be supplied.

The superimposed control circuit comprises an identification block 6; an addition element 7, to which the identified slope value $d\mu/d\lambda_{ref}$ and the specified comparison value $$\left.\frac{d\mu}{d\lambda}\right|_{Soll}$$

are supplied; a control element 8, to which the difference $$\left.\frac{d\mu}{d\lambda}\right|_{Soll} - d\mu/d\lambda_{ref}$$

is supplied and which emits a signal RA derived from this control deviation; a multiplier 9, in which the vehicle speed $V_{ref}$ obtained in a block 11 in the usual manner from the wheel speeds is multiplied by RA; and an addition element 10, in which the reference speed is also added too the product of the multiplication element 9. The pseudo-reference speed $v_{ref}$ obtained in this way is supplied as the vehicle speed to the identification block 6, to which a signal corresponding to $V_R$, and optionally a signal corresponding to $P_B$, are also supplied. The value for $v_{ref}$ that is obtained is also supplied to block 4 as a reference speed. Although a constant comparison value $\lambda_{ref}$ is specified here, a false slip is simulated with $\lambda_{ref}$ and the actually set slip value $\lambda$ is varied by way of the pseudo-reference speed $v_{ref}$.

The control circuit shown in FIG. 3 differs from that of FIG. 2 only in that in the element 4' that forms the slip, the reference speed value $V_{ref}$ derived from the wheels is processed; that the addition element 5' is supplied with the control deviation of the controller 8 directly in the form of a reference slip $\lambda_{ref}$; and that a block 12 indicates that $$\left.\frac{d\mu}{d\lambda}\right|_{Soll}$$

can be varied as a function of parameters. This last provision is also applicable in the exemplary embodiment of FIG. 2.

The controllers 2 of FIGS. 2 and 3 process the slip difference of the addition element 5 and generate control signals for the final control element 1 for varying the brake pressure. The slip difference is varied via the superimposed control circuit as a function of the slope value, identified in block 6, of the $\mu$ slip curve, in comparison with the specified fixed value of $$\left.\frac{d\mu}{d\lambda}\right|_{Soll},$$

for example, so that the entire control system sets a slip value to which, at the $\mu$ slip curve valid just at that time, a slope value corresponding to the fixed value corresponds.

For the design of the slip control circuit, it has been assumed by way of example that the pressure modulation is generated with a 3/3-way magnetic valve.

The three positions of this valve are described by the following differential equations:

$$P_B = C^+ \cdot (P_o - P_B) \quad , \text{- pressure buildup} \tag{1}$$
$$P_B = -C^- \cdot P_B \quad , \text{- pressure reduction}$$
$$P_B = 0 \quad , \text{- pressure maintenance}$$

The magnetic valve is triggered by a power amplifier, at the input of which a control signal is present. This control signal is generated by the controller 2 and can assume the following values: $-1$ (pressure reduction), 0 (pressure maintenance) and 1 (pressure buildup). The controller 2 comprises two parts. The first part ascertains the specified control variable required for regulating the wheel slip. From this, the second part ascertains the necessary valve position.

Two possible designs of the controller 2 will be described below. To simplify the description, the symbols used are explained in a list in Appendix II.

In the first design, the controller 2 ascertains the set-point brake pressure $P_{BSoll}$ in its first part as follows:

$$P_{BSoll} = \frac{(C_B \cdot \mu)_{max}}{2 \cdot \epsilon_\lambda \cdot C_1} \cdot (\lambda^*_{ref} - \lambda_{ref}) + \frac{(C_B \cdot \mu)_{max}}{2 \cdot C_1} \tag{2}$$

In this equation, $\lambda^*_{ref}$, $\epsilon_\lambda$, $(C_B \cdot \mu)_{max}$ are variables to be specified.

The derivation of this relationship is explained in an Appendix I, which relates to FIG. 4.

On the assumption that $\lambda_{ref}$ and $C_1$ would be known exactly and that $P_B = P_{BSOLL}$ is set with sufficiently great retardation, it would be guaranteed that a stationary state is established, for which $$\lambda^*_{ref} - \epsilon_\lambda > \lambda_{ref} > \lambda^*_{ref} + \epsilon_\lambda \tag{3}$$

is valid.

From equation (3), it is clear that an enduring control deviation of a maximum of $\epsilon_\lambda$ can be established.

In order to prevent this as well, an I component is added to equation (2).

With an additional D component, the transient response can also be improved. Then, the relationship is:

$$P_{BSoll} = K_R \cdot \left\{ K_P \cdot (\lambda^*_{ref} - \lambda_{ref}) + K_D \cdot \frac{d}{dt} (\lambda^*_{ref} - \lambda_{ref}) + \right. \tag{4}$$

$$\left. I_o + K_I \int_o^t (\lambda^*_{ref} - \lambda_{ref}) \cdot dt \right.$$

with $I_o = 1$, $K_R = \frac{(C_B \cdot \mu)_{max}}{2 \cdot C_1}$, $K_p = \frac{1}{\epsilon_\lambda}$ The variable $C_1$ required in (4) is in fact known only inexactly; the estimated value $\hat{C}_1$ is therefore assumed.

For $C_1 \neq \hat{C}_1$, the controller boosting varies as compared with the desired value; for $\lambda \neq \lambda_{ref}$, a slip value of $\lambda \neq \lambda^*_{ref}$ is set.

In the remainder of the algorithm, the particular suitable valve position is acertained.

A precondition for this is that $P_B$ and $P_0$ are measured. An inquiry is first made (see FIG. 5) as to whether $|P_{BSoll} - P_B| < \epsilon_p$. If so, then the signal 0 is set; that is, the pressure is maintained. If this is not the case, then a decision is made from the algebraic sign ($+$ or $-$) whether a pressure buildup or a pressure reduction is required. After that, the particular valve opening time $\Delta T$ that would then be required to attain $P_{BSoll}$ is ascertained. If $\Delta T$ is greater than or equal to a control interval $T_R$, then a control signal $+1$ or $-1$ is emitted; that is, pressure is built up or reduced.

For $\Delta T < T_R$, it is acertained whether $P_{BSoll}$ can be attained more accurately by pressure maintenance or by opening the valve. In accordance with this, the control signal $+1$ (pressure buildup), 0 (pressure maintenance) or $-1$ (pressure reduction) is emitted, with $\Delta T$ being the valve opening time during pressure buildup or reduction.

In the event that $P_B$ and $P_0$ cannot be measured, then the following design is used for slip control.

The control deviation is converted into $U_R$ in a PID transmittion element of the controller 2, in accordance with the equation $$U_R = (\lambda^*_{ref} - \lambda_{ref}) + K_D{}^1 \frac{d}{dt}(\lambda^*_{ref} - \lambda_{ref}) + \quad (5)$$

$$K_I{}^1 \cdot \int_o^t (\lambda^*_{ref} - \lambda_{ref}) \cdot dt$$

From this, the control signals are then determined:

$$\text{control signal} = \begin{cases} +1 \text{ for } U_R > \epsilon_\lambda, \\ 0 \text{ for } -\epsilon_\lambda \leq U_R \leq +\epsilon_\lambda, \\ -1 \text{ for } U_R < -\epsilon_\lambda \end{cases} \quad (6)$$

The slip control circuits described are set by the superimposed control circuit in such a way that the slope of the slip curve $d\mu/d\lambda_{ref}$ corresponds to a specified set-point value.

The required identification of the slope can be performed particularly simply if the pressure $P_B$ is kept constant over a plurality of sensing cycles.

From (a) an Appendix I, following a differentiation, it follows that $$\ddot{V}_R = C_B \cdot \frac{d\mu}{d\lambda} \cdot \lambda + C_B \cdot \mu(\lambda) \quad (7)$$

In order to be able to process this relationship, the following assumptions must be made: $C_B \approx \hat{C}_B = $ constant, and $\dot{C}_B \approx 0$; $\hat{C}_B$ is an estimated mean value of $C_B$.

From this, in a more discrete form, the following equation is obtained:

$$\left. \frac{d\mu}{d\lambda_{ref}} \right|_{(K-1)} = \frac{2}{\hat{C}_B \cdot T_A} \cdot \quad (8)$$

$$\frac{V_R(K) - 2 \cdot V_R(K-1) + V_R(K-2)}{V_R(K-2)/V_{ref}(K-2) - V_R(K)/V_{ref}(K)}$$

from which the slope that is sought can be estimated, using instead of $V_F$ the estimated vehicle speed $V_{ref}$ or $v_{ref}$.

From equation (7), it is clear that to calculate the slope, $\lambda \neq 0$ must be required.

To reduce errors resulting from interference in $V_R$, $V_{ref}$ and $v_{ref}$, the $d\mu/d\lambda_{ref}$ that is ascertained is limited.

In FIG. 6, the flow chart for the identification process is shown. If the new brake pressure $P_B$ differs only slightly from the former brake pressure $P_{BA}(<\epsilon_p)$, then identification takes place. If it is larger, identification does not take place. The first three blocks of the left-hand branch take into account the case of starting, in which DSL representing a portion of the denominator of equation (8) as shown in FIG. 2 has not yet attained the value of 3, or in other words no values (K-2) to K are present yet and the identification therefore cannot take place yet. In the following blocks, the identification takes place in accordance with the identification equation (8).

A further example for the realization of the cascade controller, using equidistant trigger pulses for the brake pressure control unit, will now be described.

For pressure modulation, a 3/3-way valve is again used. The valve triggering is preceded by a logic element which realizes an opening time of the inlet and outlet valve in proportion to its input signal and subsequently closes both valves, or in other words keeps the wheel brake pressure constant. For a small component of the working brake pressure, it is assumed for the sake of simplification that from a buildup time $\Delta T^*(K)$, a proportional brake pressure increase $\Delta P_{BK}$ results, in accordance with the equation $$\Delta P_B(K) = b^+ \cdot \Delta T^*(K), \, b^+ \approx \text{const}. \quad (9)$$

The same would apply for the pressure reduction:

$$\Delta P_B(K) = b^- \cdot \Delta T^-(K), \, b^- \approx \text{const}. \quad (10)$$

The variables $b^+$, $B^-$ can be identified, as will be shown later. In order to avoid excessively high switching frequencies, $\Delta T^+(K)$, $\Delta T^-(K)$ are then set to zero, whenever they drop below a minimum time (for example 2 ms). $\Delta T^+(K)$, $\Delta T^-(K)$ are upwardly limited to the sensing time $T_A$.

In the remaining region, $\Delta T^+(K)$, $\Delta T^-(K)$ are ascertained according to the following principle:

$$\left. \begin{array}{l} \Delta T^+(K) = U(K) \\ \Delta T^-(K) = 0 \end{array} \right\} \text{for } U(K) > 0, \quad (11)$$

$$\left. \begin{array}{l} \Delta T^+(K) = 0 \\ \Delta T^-(K) = -U_K \end{array} \right\} \text{for } U(K) < 0.$$

The variable U(K) is formed in a discrete $PD_{T1}$ element as follows:

$$\left. \begin{array}{l} U(K) = U_P(K) + U_D(K), \\ U_D(K) = \phi_D \cdot U_D(K-1) + (1 - \phi_D) \cdot \\ \quad K_D(K) \cdot (\Delta\lambda(K) - \Delta\lambda(K-1))/T_A \\ U_P(K) = K_P(K) \Delta\lambda(K) \end{array} \right\} \quad (12)$$

The control deviation $\Delta\lambda(K)$ is formed from:

$$\Delta\lambda(K) = \lambda^*_{ref}(K) - \lambda_{ref}(K) \quad (13)$$

Because of the dynamic properties of the controlled system it is logical for the P or D boosting factors to be made dependent on speed:

$$K_P(K) = K_{PO} \cdot V_{ref}(K) \\ K_D(K) = K_{DO} \cdot V_{ref}(K) \quad \Bigg\} \tag{14}$$

Furthermore, the factors $K_{P0}$, $K_{D0}$ can be adapted to the controlled system:

$$K_P(O) = K_{PO}\left(b^+, b^-, \frac{d\mu}{d\lambda}\right) \\ K_D(O) = K_{DO}\left(b^+, b^-, \frac{d\mu}{d\lambda}\right) \Bigg\} \tag{15}$$

A block circuit diagram for realizing this triggering is provided in FIG. 7. There, in a block 20, the control deviation $\Delta\lambda(K)$ is formed, in accordance with equation (13). In block 21, U(K) is first obtained in accordance with equation (12), and then from it $\Delta T^*(K)$ and $\Delta T^-(K)$ are obtained according to equation (11). Taking into account the identified variables $b^+$ and $b^-$ input in a block 22 and the time values $\Delta T$, in block 22 the pulses of a pulse transducer 23 of constant frequency are modulated in their length and supplied to the 3/3-way magnetic valve 1' for triggering the pressure buildup or pressure reduction position; the triggering times can be varied between a minimum value and a maximum value. The variables $b^+$ and $b^-$ could also be already taken into account in the calculation of $\Delta T^+$ and $\Delta T^-$, or could be incorporated into the calculation of the variables $K_p$ and $K_D$, as indicated in equation (15).

In contrast to the two adaptive slip controllers described above, in this example not only the slope of the slip curve but also the unknown proportionality factors $b^+$ and $b^-$ are identified.

From the differential equation for the wheel at two sensing instants:

$$V_R(K+1) = C_B \cdot \mu(\lambda(K+1)) - C_1 \cdot P_B(K+1) \\ V_R(K) = C_B \cdot \mu(\lambda(K)) - C_1 \cdot P_B(K) \Bigg\} \tag{16}$$

the identification equation $$V_R(K+1) - V_R(K) = a \cdot (\lambda(K-1) - \lambda(K)) - b^+ \cdot C_1 \cdot \Delta T^-(K)^+ - b^- \cdot C_1 \Delta T(K) \tag{17}$$

can be obtained.
In it, $$V_R(K+1) - V_R(K) \approx (V_R(K+1) - 2V_R(K) + V_R(K-1))/T_A, \tag{18}$$

$\Delta T(K)^+$, $\Delta T(K)^-$ and $(\lambda(K+1) - \lambda(K))$ are known variables, while the coefficients $$a = C_B \cdot \frac{\mu(\lambda(K+1)) - \mu(\lambda(K))}{\lambda(K+1) - \lambda(K)}, \, b^+ \cdot C_1 \text{ and } b^- \cdot C_1$$

have to be identified.
The variable $$\frac{\mu(\lambda(K+1)) - \mu(\lambda(K))}{\lambda(K+1) - \lambda(K)}$$

is the mean inclination $d\mu/d\lambda$ of the slip curve in the time interval under observation.

The identification from equation (17) takes place by inserting the measured values at a plurality of instants, and can be done with one of the known identification methods (such as the method of least error squares). Since in equation (17) the slip is formed using $V_{ref}$, for identification purposes $\lambda$ must be approximated by means of $\lambda_{ref}$.

A flow chart for this identification is provided in FIG. 8. There, the term z is formed in accordance with equation (18) and the variables $a_1$ through $a_3$ are calculated. In the following block (recursive estimation), an equation system having the unknowns $x_1$ through $x_3$ is solved by the recursive least squares method, the square root information filter method, or some other method, and then the values sought for $d\mu/d\lambda$, $b^+$ and $b^-$ can be calculated.

Once the slope value is obtained by one of the methods mentioned, the difference $$\left.\frac{d\mu}{d\lambda}\right|_{Soll} - \left.\frac{d\mu}{d\lambda}\right|_{(K-1)}$$

is formed in the addition element 7, and in the controller 8 the calculation of the control signal RA is performed, taking the course shown in FIG. 9. If the value ascertained for $d\mu/d\lambda$ is less than 0, then a constant is added to the instantaneous control deviation, to put $d\mu/d\lambda$ back into the positive range. If $d\mu/d\lambda$ is greater than 0, then the above difference (DELB) is formed and supplied to the controller 8. This controller exhibits integration behavior.

After the calculation of $$v_{ref} = V_{ref} RA + V_{ref} \tag{18}$$

the controller output signal RA, in the exemplary embodiment of FIG. 2, is then supplied for the calculation of the reference slip.

By the conversion according to equation (18), an impermissible drop in $v_{ref}$, if $V_{ref}$ drops too far because of errors in its calculation, can be prevented.

In the exemplary embodiment of FIG. 3, RA corresponds to the set-point reference signal $\lambda^*_{ref}$.

APPENDIX I

The following method is used in designing the controller 2:

$$\dot{V}_R = -C_1 \cdot P_B + C_B \cdot \mu(\lambda, \text{Parameter}), \tag{a}$$

$$C_1 = \frac{R_d}{J} \cdot \left(\frac{M_B}{P_B}\right), \, C_B = \frac{R_d^2 F_N}{J}$$

From (a), stationary states are now to be ascertained. For these states, the following applies:
$\lambda = 1 - V_R/V_F = \text{constant.}$, that is, $\dot{\lambda}_s = 0$.
From this, it follows that $$\dot{V}_{RS} = (1-\lambda_s) \cdot \dot{V}_{FS}, \quad (b)$$

in which $\dot{V}_{FS}$ is constant.

Equation (2) thus becomes $$(1-\lambda_s) \cdot V_{FS} + C_1 \cdot P_{BS} = C_B \cdot \mu(\lambda_s). \quad (c)$$

The basis for what follows is a control principle that provides a linear relationship between $P_{BSoll}$ and $\lambda$; the following equation then applies:

$$P_{BSoll} = P_{BSoll}(\lambda).$$

The stationary solution $\lambda$ is now determined by the intersection between the straight line $$(1-\lambda) \cdot V_{FS} + C_1 \cdot C_1 \cdot P_{BSoll}(\lambda)$$

and the curve $C_B \cdot \mu(\lambda)$.

Ignoring the terms $(1-\lambda) V_{FS}$, this factual situation is shown in FIG. 4. With the designations provided in FIG. 4, the relationship according to equation (2) is obtained for $P_{BSoll}$.

APPENDIX II

| | Symbols used: |
|---|---|
| $P_B$ | brake pressure (wheel brake cylinder) |
| $P_o$ | pilot pressure |
| $\lambda$ | slip |
| $\lambda_{ref}$ | reference slip |
| $V_F$ | vehicle speed |
| $V_R$ | wheel speed |
| $V_{ref}$, $\dot{V}_{ref}$ | } reference speeds |
| $\mu$ | coefficient of adhesion |
| $\epsilon_\lambda, \epsilon_p$ | threshold values (control deviation) |
| $R_d$ | dynamic wheel radius |
| $F_N$ | normal force on wheel |
| $J$ | wheel moment of inertia |
| $\left(\dfrac{M_B}{P_B}\right)$ | (brake moment/brake pressure) |
| $K_i^1$ | boosting factors |
| $T_R$ | control interval |
| $T_A$ | sensing interval |
| $C^+, C^-, b^+, b^-$ | valve constants |
| $C_1, C_B$ | see equation (2) |
| $\hat{C}_1, \hat{C}_B$ | estimated values for above |
| $(C_B \cdot \mu)_{max}$ | maximal value to be expected for $C_B\mu$ |
| $C_1 \cdot P_{BSoll}$ | straight lines of wheel deceleration to be set |
| $\Delta P_B$ | jump in wheel brake pressure |
| $\tau D$ | weighting factor |
| $\Delta T, \Delta T^+, \Delta T^-$ | valve opening times |

We claim:

1. A method for adjusting an optimal vehicle wheel slip in terms of the coefficient of adhesion in the longitudinal and transverse direction, which comprises: determining a deviation of an ascertained slip value $\lambda_{ref}$ from a comparison slip value $\lambda^*_{ref}$ by means of a slip controller, varying brake pressure by triggering a brake pressure control system in a direction of adjusting the slip value to the comparison slip value by an underlying control circuit, determining the slope of the $\mu$ slip curve $d\mu/d\lambda$ within a superimposed control circuit, comparing this slope with a specified positive slope value, using the comparison in a second controller to produce said comparison slip value $\lambda^*_{ref}$ dependent upon the comparison result.

2. A method as defined by claim 1, which further comprises varying a specified positive slope value in accordance with parameters.

3. A method as defined by claim 2, determining a coefficient of adhesion so that a variation of the slope value $d\mu/d\lambda$ takes place to value 0 if the parameters indicate that a low coefficient of adhesion in the transverse direction is permissible at that instant.

4. A method as defined by claim 2 determining the steering angle and/or the yawing acceleration of the vehicle for the parameters for the variation.

5. A method as defined by claim 1, which comprises using a slip controller including a pressure element for acertaining the trigger signals, required for controlling the wheel slip, for the brake pressure control system.

6. The method as defined by claim 5, in which $P_{BSoll}$ is determined as $$P_{BSoll} = \frac{(C_B \cdot \mu)_{max}}{2\epsilon_\lambda \cdot \hat{C}_1} \cdot (\lambda^*_{ref} - \lambda_{ref}) + \frac{(C_B \cdot \mu)_{max}}{2 \hat{C}_1}$$

in which

| | |
|---|---|
| $P_{BSoll}$ | is the set-point brake pressure, |
| $\lambda^*_{ref}$ $\epsilon_\lambda$ | } are variables to be specified, |
| $\lambda_{ref}$ | is the reference slip to be ascertained, |
| and | |
| $\hat{C}_1$ $(C_B \cdot \mu)_{max}$ | } are constants to be estimated. |

7. A method as defined by claim 5, which comprises augmenting the pressure element with an integral element.

8. A method as defined by claim 7, which comprises adding a differential element.

9. A method as defined by claim 5, in which comprises deriving a control signal for the pressure buildup, pressure maintenance or pressure reduction from the difference between the ascertained set-point brake pressure and the measured actual brake pressure in one portion of the slip controller.

10. A method as defined by claim 9, which comprises ascertaining the length of the trigger signal for the pressure buildup or pressure reduction in accordance with the direction and magnitude of the deviation and taking into account the measured pilot pressure.

11. A method as defined by claim 5, which comprises determining in the controller the control deviation $$U_R = (\lambda^*_{ref} - \lambda_{ref}) + K_D^1 \frac{d}{dt}(\lambda^*_{ref} - \lambda_{ref}) + K_I^1 \cdot \int_0^t (\lambda^*_{ref} - \lambda_{ref}) dt$$

in $\lambda^*_{ref}$, $K_D^1$ and $K_T^1$ are specified variables and $\lambda_{ref}$ is the ascertained variable, and that from the algebraic sign (+ or −) and the magnitude of the deviation, deriving the control command for the brake pressure control unit for pressure reduction, maintenance or buildup.

12. A method as defined by claim 1, which comprises determining the control variable $$U(K) = U_p(K) + U_D(K),$$

$$U_D(K) = \phi_D(K-1) + (1-\phi_D) \cdot K_D(K) \cdot (\Delta\lambda(K) - \Delta\lambda(K-1))/T_A,$$

$$U_p(K) = K_p(K) \cdot \Delta\lambda(K)$$

in a proportional/differential element, where the index (k) or (K−1) are the corresponding values at the sensing times, which are separated by the interval $T_A$, and $K_p$, $K_D$ are boosting factors variable over time,
$U_D$ is the differential component,
$U_p$ is the proportional component,
$\phi_D$ is a weighting factor, and
$\Delta\lambda K = (\lambda^*_{ref}(K) - \lambda_{ref}(K))$ means that from the algebraic sign for U(K) determining the direction of the pressure change and determining from the amount of U(K) the length of equidistant trigger pulses for the brake pressure control unit.

13. A method as defined by claim 12, which comprises making the proportional and differential boosting factors dependent on speed and/or on the proportionality factors $b^-$ and $b^+$.

14. A method as defined by claim 12, which comprises ascertaining from the identification equation $$\dot{V}_R(K+1) - \dot{V}_R(K) = a \cdot (\lambda_{ref}(K+1) - \lambda_{ref}(K)) - b^+ \cdot C_1 \cdot \Delta T(K)^+ - b^- \cdot C_1 \cdot \Delta T(K)^-$$

in which $$\dot{V}_R(K-1) - \dot{V}_R(K) \approx (V_R(K+1) - 2V_R(K) + V_R(K-1)/T_A,$$

$V_R(K) =$ the wheel speed, $\Delta T^+(K) = U(K)$ for $U(K) > 0$, $\Delta T^+(K) = 0$ for $U(K) \leq 0$, $\Delta T^-(K) = -U(K)$ for $U(K) < 0$, $\Delta T^-(K) = 0$ for $U(K) \geq 0$, and $\lambda_{ref}(K+1) - \lambda_{ref}(K)$ are known variables, by insertion of these values at various instants the variables a, $b^+ \cdot C_1$ and $b^- \cdot C_1$, where a is proportional to the mean slope $d\mu/d\lambda$ and from the ascertained variables $b^+ \cdot C_1$ and $b^- \cdot C_1$, using the estimated value $\hat{C}_1$ and $C_1$, obtaining the variables $b^+$ and $b^-$.

15. A method as defined by claim 1, in which the ascertained value is derived from the relationship $$\left.\frac{d\mu}{d\lambda}\right|_{(K-1)} = \frac{2}{\hat{C}_B \cdot T_A} \cdot \frac{V_R(K) - 2 \cdot V_R(K-1) + V_R(K+2)}{\frac{V_R(K-2)}{V_{ref}(K-2)} - \frac{V_R(K)}{V_{ref}(K)}}$$

where
(K), (K-1), (K-2), (K+2) are the corresponding values at the sensing times.
$d\mu/d\lambda$ is estimated, where
$V_R$ is the known wheel speed
$V_{ref}$ is the known reference speed
$\hat{C}_B$ is an estimated mean value of $$C_B = \frac{R_d^2 F_N}{J}$$

$R_d$ is the dynamic wheel radius
$F_N$ is the normal force of the wheel
$J$ is the wheel moment of inertia
$T_A$ is the sensing time.

16. A method as defined by claim 14, which comprises comparing the ascertained value for $d\mu/d\lambda$ with the specified slope value, and supplying the difference to a controller, which from it forms a comparison slip $\lambda^*_{ref}$.

17. A method as defined by claim 14, which comprises comparing the ascertained value for $d\mu/d\lambda$ with the specified slope value, and supplying the difference to a controller, which from it forms a control deviation RA, which is processed with the ascertained reference speed into a pseudo-reference speed, which enters into the slip formation for generating the slip to be compared with the fixed comparison value.

18. A method as defined by claim 17, which comprises processing the control deviation by adding the control deviation to the ascertained reference speed.

19. A method as defined by claim 18, which comprises processing of the control deviation by multiplication of the control deviation by the ascertained reference speed and adding the ascertained reference speed to the product.

20. A method for adjusting an optimal vehicle wheel slip in terms of the coefficient of adhesion, $\mu$, in the longitudinal and transverse direction, which comprises: determining a deviation of an ascertained slip value $\lambda_{ref}$ from a comparison slip value $\lambda^*_{ref}$ by means of a slip controller, varying brake pressure by triggering a brake pressure control system in a direction of adjusting the slip value to the comparison slip value by an underlying control circuit, determining the slope of the $\mu$ slip curve $d\mu/d\lambda$ within a superimposed control circuit, comparing this slope with a specified positive slope value, using the comparison by a second controller to produce a speed signal which is dependent on the comparison result and which is used in determining the ascertained slip value.

21. A method as defined by claim 20, which further comprises varying a specified positive slope value in accordance with parameters.

22. A method as defined by claim 20, which further comprises using a slip controller including a pressure element for ascertaining the trigger signals, required for controlling the wheel slip, for the brake pressure control system.

23. A method as defined by claim 20, in which the ascertained value is derived from the relationship:

$$\left.\frac{d\mu}{d\lambda}\right|_{(K-1)} = \frac{2}{\hat{C}_B \cdot T_A} \cdot \frac{V_R(K) - 2 \cdot V_R(K-1) + V_R(K+2)}{\frac{V_R(K-2)}{V_{ref}(K-2)} - \frac{V_R(K)}{V_{ref}(K)}}$$

where $d\mu/d\lambda$ is estimated, and where;
K, (K−1), (K−2), (K+2) are the corresponding values at the sensing times,
$V_R$ is the known wheel speed,
$V_{ref}$ is the known reference speed,
$\hat{C}_B$ is an estimated mean value of $$C_B = \frac{R_d^2 F_N}{J},$$

$R_d$ is the dynamic wheel radius,
$F_N$ is the normal force of the wheel,
J is the wheel moment of inertia, and
$T_A$ is the sensing time.

* * * * *